United States Patent [19]

Watanabe et al.

[11] Patent Number: 4,940,562
[45] Date of Patent: Jul. 10, 1990

[54] FILTER ELEMENT AND METHOD FOR MANUFACTURE THEREOF AND MICRO-FILTRATION FILTER HAVING THE FILTER ELEMENT

[75] Inventors: Masaharu Watanabe; Takashi Monzen, both of Tokyo, Japan

[73] Assignee: Kitz Corporation, Japan

[21] Appl. No.: 229,336

[22] Filed: Aug. 5, 1988

[51] Int. Cl.$^5$ .............................................. B01D 67/00
[52] U.S. Cl. .................................... 264/234; 264/248; 264/257; 264/331.14; 264/DIG. 48
[58] Field of Search ...................... 210/321.87, 321.84; 264/41, 45.1, DIG. 48, DIG. 62, 46.4, 48, 232, 234, 239, 241, 248, 257, 319, 331.14

[56] References Cited

U.S. PATENT DOCUMENTS

| | | | |
|---|---|---|---|
| 4,334,992 | 6/1982 | Bonin et al. | 210/321.84 |
| 4,401,566 | 8/1983 | Igari et al. | 210/321.87 |
| 4,597,868 | 7/1986 | Watanabe | 210/321.84 |

Primary Examiner—Frank Sever
Attorney, Agent, or Firm—Bruce L. Adams; Van C. Wilks

[57] ABSTRACT

A filter element includes unit members and spacers interposed one each between adjacent ones of the unit members. Each unit member includes a supporting plate having a pair of planar porous membranes joined to the opposite surfaces thereof and also having an opening for insertion of a spacer and removal of a cleaned fluid. The opening has an inner peripheral surface and a stepped part. Each spacer having an outer peripheral part and a stepped part. The stepped part of the opening of one unit member and the outer peripheral part of one spacer define a first axial seal part therebetween, and the inner peripheral surface of the opening of another unit member and the stepped part of the one spacer define a second axial seal part therebetween. The unit members and spacers are interconnected by tightly joining the supporting plates and the spacers at the first and second axial seal parts. The filter element is manufactured by forming the first axial seal part by means of thermal fusion in the axial direction, forming the second axial seal part by means of thermal fusion in the axial direction, and repeating the formation of the first and second seal parts. A micro-filtration filter has the filter element accommodated therein.

14 Claims, 23 Drawing Sheets

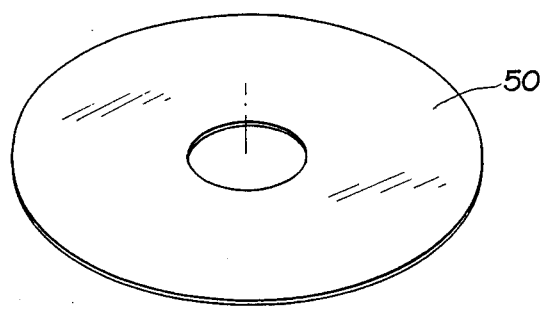
FIG.32(A)
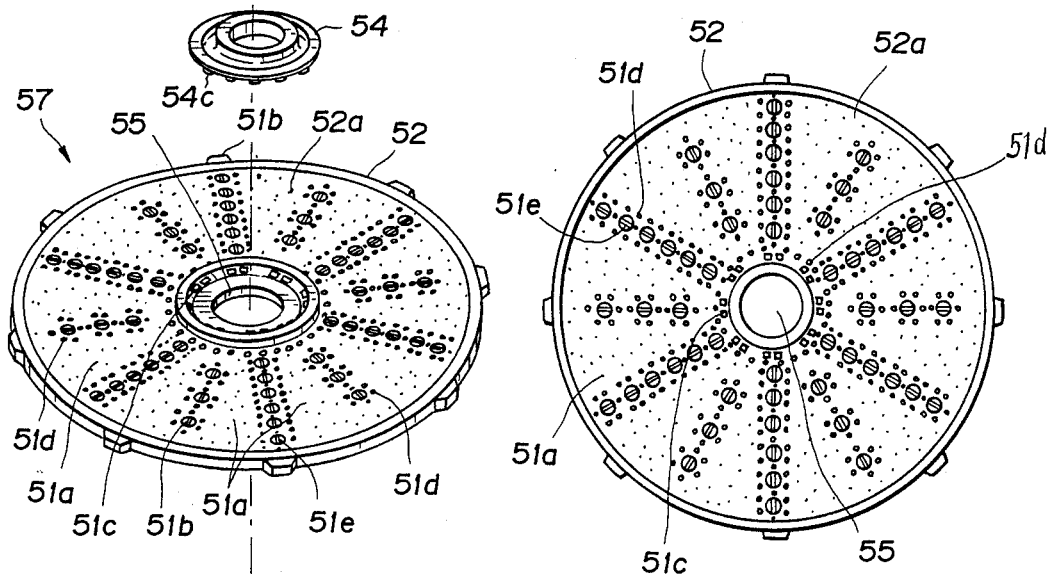
FIG.32(B)
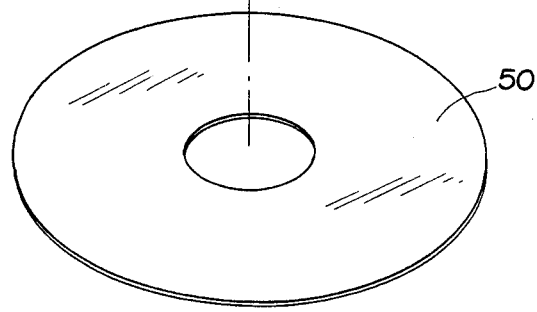

FILTER ELEMENT AND METHOD FOR MANUFACTURE THEREOF AND MICRO-FILTRATION FILTER HAVING THE FILTER ELEMENT

BACKGROUND OF THE INVENTION

1. Field of the Invention

The present invention relates to a filter element for removing minute particles from a raw fluid used in the industries of semiconductors, pharmaceuticals, chemicals, etc., such as a strongly acidic or basic fluid having high corrosiveness or reactivity, particularly an active fluid including an organic solvent, for example, also to a method for the manufacture of the filter element and further to a microfiltration filter having the filter element.

2. Description of the Prior Art

As for filter media, there have heretofore been known filter paper, filter cloth, filter net, nonwoven fabric and sintered articles. When the diameter of minute particles in a raw fluid is on the order of microns or submicrons falling within a so-called micro-filtration region, porous membranes made of various polymers have been used. Since the porous membranes are thin films having a thickness in the range of from tens of microns to hundreds of microns and have a high porosity, they are very brittle and, when being used per se, difficult to resist high pressure of filtration. For this reason, the porous membranes have been retained on a meshy support member in order to prevent their deformation or breakage and to form flow paths for the cleaned fluid. In addition, the porous membranes exhibit high precision of filtration, whereas they exhibit high resistance of filtration per unit area and are liable to clog. Therefore, the porous membranes are required to have a large area in comparison with the area of the aforementioned filter media ordinarily used.

In view of this and the recent tendency to miniaturization of a filter having a porous membrane, various constructions of such filters have been proposed.

For example, FIG. 1 illustrates a prior art pleat cartridge filter (hereinafter referred to simply as the "pleat type filter"), in which a porous membrane 1 and support members 2 intervening the porous membrane 2 therebetween are pleated and folded up. The folded up state of the porous membrane 1 and support members 2 is retained by an outer protective cylinder 3 and a center core 4. The opposite ends of the protective cylinder 3 are sealed up by seal members 5. The pleat type filter having the construction described above is disadvantageous in that it cannot resist high pressure of filtration, that the effective area of the porous membrane 1 is decreased due to the presence of the area for an adhesive agent, and that the loss of pressure of filtration becomes large because the adjacent portions of the pleatd and folded up porous membrane 1 are close to each other.

FIGS. 2 and 3 illustrate prior art filters of a type in which a plurality of unit members each having a support member laminated with a porous membrane are piled up (hereinafter referred to simply as the "pileup type filter"). In FIG. 2, a support member 10 having a plurality of ribs 8 for forming fluid paths for the cleaned fluid is laminated with a porous membrane 6 which is supported on the ribs 8 and attached to the support member 10 at both the outer periphery 12 of the support member 10 and the peripheral edge 14 of a cleaned fluid takeout opening, thereby forming a unit member 18, and a plurality of unit members 18 are piled up vertically at regular intervals in a coupled state through boss portions 16. In FIG. 3, reference numeral 7 designates a porous membrane, 9 a rib, 11 a support member, 13 the outer periphery of the support member 11, 15 the peripheral edge of a cleaned fluid takeout opening, 17 a butt joint portion, and 19 a unit member. The pileup type filter shown in FIG. 3 has a construction substantially the same as that of the pileup type filter shown in FIG. 2 and has a plurality of unit members 19 piled up vertically at regular intervals in a coupled state through the butt joint portions 17. These pileup type filters are free from the aforementioned disadvantages of the pleat type filter.

The filters using a porous membrane have been developed, irrespective of the type thereof, in order to filtrate a realtively inactive fluid, such as water, air, nitrogen, etc. in the pharmaceutical and food industries and, therefore, the porous membrane is made of cellulosic polymers including cellulose acetate and cellulose nitrate, polyamide, polysulfone, polyvinyl chloride, polymethyl methacrylate, polyvinyl alcohol, polycarbonate, polyethylene or polyvinylidene fluoride, for example. The support member is molded of polystyrene, polycarbonate, polycarylonitrile, polysulfone or polypropylene, for example. Other members with which a fluid will come into contact, such as a seal member, are formed of natural or synthetic rubber, polyuurethane or epoxy resin, for example.

With the progress of the industries requiring complete elimination of foreign matter, represented by the semiconductor industry, minute particles in a highly active fluid including a strongly acidic or basic fluid exhibiting high corrosiveness, a fluid exhibiting high reactivity and an organic solvent have been regarded as foreign matter. Recently, therefore, there is an increasing demand for the development of filters capable of filtrating such a highly active fluids as described above in addition to a comparatively inactive fluid including water and air. However, filters made of any of the widely used polymers enumerated above cannot sufficiently deal with such an active fluid from the standpoint of resistance to chemicals and solvents. Particularly when fluids used in the etching and epitaxy processes in the manufacture of semiconductors are to be filtrated, filters have to be made of a chemically stable material. For example, fluorine resins and fluorine resin copolymers such as PTFE, PFA, EPE, FEP, ETFE, PCTFE and ECTFE can be practically used effectively as a material for filters. Thus, there is an increasing demand for the development of small-sized highly reliable filters having a porous membrane, a support member, a seal member and any other fluid-contacting member formed of a fluorine resin or fluorine resin copolymer so that they do not suffer from any disadvantage when being brought into contact with a fluid.

In the meantime, it is one of the most important techniques for producing a filter element of any type of filter how the flow paths for a raw fluid and for a cleaned fluid are separated from each other with exactitude in order to prevent the raw fluid from leaking and mixing with the cleaned fluid. That is to say, means for sealing a porous membrane with exactitude is important in the case of the pleat type filters and, in the case of the pileup type filters, means for sealing a porous membrane and a support member with exactitude is important.

As for the sealing means usable for constructing a filter element formed of any of the aforementioned widely used polymers for filtrating an ordinary inactive fluid, there can be adopted any one of the conventional general resin-sealing methods, such as the hot press method, ultrasonic sealing method solvent sealing method and method using adhesives or sealants, for example. However, these general resin-sealing methods are not effectively applicable to a filter element having all fluid-contacting members thereof including a porous membrane formed of a fluorine resin or fluorine resin copolymer for filtrating an active fluid because a fluorine resin or fluorine resin copolymer is characterized in that it has a high melting point, that it exhibits poor fluidity and low heat transmission property even at the melting point thereof, that it has a small coefficient of friction and that it is chemically inactive. Due to the physical and chemical properties of a fluorine resin or fluorine resin copolymer, it is very difficult to seal fluorine resins or fluorine resin copolymers together, or to seal a fluorine resin and a fluorine resin copolymer. In fact, there is little prior art disclosing an easy and reliable method for sealing them and no prior art disclosing an easy and reliable method for sealing a special portion of a specific shape, such as a portion of the pleat type filter to be sealed, portions of unit members constituting a filter element of the pileup type filter.

Therefore, it is considered that a thermal sealing method comprising the steps of heating surfaces of fluorine resins and/or fluorine resin copolymers to be sealed uniformly as much as possible to temperatures higher than their melting points and thereafter immediately, preferably simultaneously, contacting the surfaces under pressure is a sole and relable means. However, since they are inferior in heat transmission property, the surfaces thereof to be sealed must be heated directly. This will raise a problem on how heat is given to the surfaces. Indirect heat generating methods, such as ultrasonic sealing method, vibration sealing method and rotation sealing method, utilizing friction between the portions to be sealed will produce dust and will therefore be unsuitable as a sealing method of a filter requiring clearness of the filtrate. The surfaces to be sealed must be fused by a flame or by blowing a high-temperature gas and immediately thereafter, preferably simultaneously, pressed against each other.

Due to the recent tendency to miniaturization of a filter element of a pileup type filter, the thickness of a support member and the distance between adjacent support members must be made as small as possible. However, in Japanese Utility Model Public Disclosure No. 59-102111, Japanese Patent Public Disclosures Nos. 56-129016, 58-98112 and 59-62323, it is very difficult to cause portions being sealed to adhere to each other under pressure by directly heating the portions from a gap between adjacent support members or from an opening of the support member in view of the shapes of the respectively disclosed support members. Therefore, it is necessary to adopt the second best method which comprises heating portions being sealed separately and causing the portions to adhere to each other under pressure as soon as possible after the heating step. However, very harsh conditions must be controlled in order to heat the portions being sealed uniformly without deforming the portions being sealed and without injuring porous membranes and portions having nothing to do with the sealing, and an exclusive special automatic machine is required in order to enhance the yield in a given process.

In view of the aforementioned difficulty, the piled up unit members 18 in FIG. 2 (Japanese Patent Public Discoslure No. 58-98111) are sealed not by heating but by the use of screws. With such mechanical sealing, it is difficult to ensure the sealing property.

In order to solve the aforementioned problems, the inventors have conducted various studies on conditions for sealing fluorine resins together and on shapes of the portions to be sealed. Generally, fluorine resins have a melting point in the range of 200 to 300 degrees centigrade which is higher than the melting points of the widely used resins, exhibit an inferior heat transmission property, and do not exhibit fluidity necessary for thermal adhesion even at tempertures higher than their respective melting points. For this reason, fluorine resins are inferior in thermal adhesion property even it they are of the same kind. Therefore, it has come to a conclusion that the thermal adhesion of fluorine resins is effected by heating the portions to be sealed at their surfaces, preferably to some depths thereof, at a predetermined temperature higher than the melting point to cause fluidity necessary for adhesion on the surfaces and thereafter immediately removing a heat source and contacting the surfaces under pressure and that more preferably the aforementioned heating is effected with the surfaces kept in contact with each other.

The support member for supporting thereon a porous membrane used in a planar state as a filter medium for a single layer filter or pileup type filler has a construction such that it has a plurality of concentric ribs (Japanese Patent Public Disclosure No. 56-129016) having the same width and spaced at regular intervals so as to support the whole of the filter medium and also has a plurality of slits communicating with an outflow port for a cleaned filtrate or has a construction such that it is formed of a net or a film having a plurality of bores communicating with an outflow port for a cleaned filtrate.

The drawbacks suffered by the conventional filter having the aforementioned support member with ribs will be described with reference to FIGS. 4(A) and 4(B).

Referring to FIG. 4(A), a support member 22 has a plurality of ribs 22a having a small width and having a large space left between the adjacent ones for the purpose of increasing the effective area of a membrane 21 to increase the flow rate of a cleaned filtrate. With this structure, however, the membrane 21 is liable to be flexed or damaged by the filtration pressure. When the membrane is flexed, it will come into intimate contact with the bottom of the support member 22 between the ribs 22a, thereby decreasing the flow rate of a cleaned filtrate.

Referring to FIG. 4(B), a support member 22 has a plurality of ribs 22a having a large width and having a small space left between the adjacent ones for the purpose of eliminating the drawbacks suffered by the support member of FIG. 4(A). With this structure, however, the effective area of a membrane 21 is decreased because the membrane comes into intimate contact with the large width of the ribs 22a.

As is clear from the comparison between the support members 22 shown in FIGS. 4(A) and 4(B), the width of and the space between the ribs 22a are determined by the strength of the membrane 21 and the loss of the effective area of the membrane 21 produced by the contact between itself and the ribs 22a must be considered as an inevitable consequence. In addition, the increase in effective area of a membrane will hinder the recent tendency to miniaturization of a filter. Furthermore, in the case where the height of spaces constituting flow paths for a cleaned filtrate passing through the membrane is constant, the larger the pressure loss the smaller the space areas, leading to an increase in resistance against the flow paths and a possibility of the flow paths being stopped up.

On the other hand, disposable pileup type filters have been proposed such as in Japanese Patent Public Disclosure No. 56-129016 and Japanese Utility Model Public Disclosure No. 59-102111, for example.

In the former Disclosure, as shown in FIG. 5, a support member 31 having a plurality of ribs 31a is prepared by injection molding and two porous membranes 32a and 32b of different shapes immersed in a solvent are attached to the opposite surfaces of the support member 31 respectively to form a unit member. A plurality of such unit members are piled one on top of another at regular intervals to constitute a disposable pileup type filter. Use of the two membranes of different shapes will increase the cost of parts and assembly cost. Use of a solvent will cause attachment of the solvent to undesirable portions of the membranes 32a, 32b and support member 31 and will also cause an adverse phenomenon, such as clogging of the membranes. Furthermore, the attachment of the membranes 32a and 32b over the entire surfaces of the ribs 31a will decrease the effective area of the membranes.

In the latter Disclosure, as shown in FIG. 6, a support member 36 is composed of upper and lower members 36a, 36b of different shapes each having a plurality of ribs. The two members 36a and 36b of different shapes are assembled with a prescribed space formed therebetween into the support member 36 having the upper and lower surfaces which are the same in shape. A pair of porous membranes 32 of the same shape immersed in a solvent are attached to the upper and lower surfaces of the support member 36 to form a unit member. A plurality of such unit members are piled one on top of another with a spacer intervening therebetween on the side of the flow path for a raw fluid. Thus, the assembly of a plurality of unit members into a disposable pileup type filter is cumbersome. While the filter shown in FIG. 5 uses two porous membrane 32a and 32b of different shapes, the filter shown in FIG. 6 uses two members 36a and 36b of different shapes constituting the support member 36. Therefore, the cost of parts and assembly cost will similarly be increased. The other drawbacks suffered by the filter shown in FIG. 5 still remain in the filter shown in FIG. 6.

In the micro-filtration field, there are hollow yarn type, coil type, pleat type and pileup type modules. In any of these modules, a filter element is of a cartridge and, when being integral with a housing for accommodating the filter element, it can serve as a filter. The material of which the housing is made is generally divided into metal and synthetic resin and is determined depending on various conditions, such as the kind, degree of activity, temperature, pressure, etc. of a fluid.

A filter belonging to the micro-filtration filter which has recently been used in the semiconductor industry requires its fluid flow paths to have smooth surfaces and also requires its housing to have a smooth inner surface. In addition, it is necessary to prevent minute particles of the material of a filter element from being scattered within the housing.

Referring to FIGS. 7, 8, 9(A) and 9(B), a fluid introduced into an inlet portion 41a of a housing 41 is filtered by filter elements 42 incoporated into the housing 41 and is taken out as a cleaned filtrate from an outlet portion 41b of the housing 41. Since the downstream side 42b of the filter elements 42 is sealed tightly by the use of an O-ring 43 (or a gasket, adhesive, etc.), the cleaned filtrate can be taken out of the outlet portion 41b without being contaminated by the raw fluid. On the other hand, the upstream side 42a of the filter elements 42 is not so tightly sealed. For this reason, the prior art shown in FIG. 7 has the upstream side 42a kept in the state of not in contact with the inner surface of the housing 41, that shown in FIG. 8 has a shock absorbing member 44 (e.g. a spring or rubber member) provided so as to enhance the tight seal construction on the downstream side 42b, and that shown in FIG. 9(A) or FIG. 9(B) has a ridge 45 or a projection 46 with a slit 46a provided at a position in the vicinity of the inlet portion 41a for the purpose of supporting thereon part of the filter elements 42 on the upstream side 42a.

In the case where the filter elements 42 on the upstream side 42a is not in contact with the inner surface of the housing 41, as illustrated in FIG. 7, there is a possibility of a seal mechanism on the upstream side 42a being damaged by external impact during the conveyance of the filter, or of the O-ring 43 being detached from the mounting portion. This will cause the filter to malfunction. In addition, there is a possibility of the O-ring 43 being detached form the mounting portion by the reverse pressure in use.

In the case where the shock absorbing member 44 is interposed between the upstream side 42a of the filter elements 42 and the inlet portion 41a of the housing 41 to retain the filter elements thereon, as illustrated in FIG. 8, the problems raised in the prior art of FIg. 7 will be able to be solved. In this case, however, the number of components is increased and, when a fluid is an organic solvent of halide or a strongly acidic or alkaline fluid, for example, it is required to select a proper material for the shock absorbing member 44, thus leading to increase in cost.

In FIG. 9(A) or FIG. 9(B), if the housing 41 is made of synthetic resin, the ridge 45 or projection 46 can be formed with ease by injection molding. When the housing 41 is made of metal, however, mechanical processing including milling and drilling operations is required, thereby inevitably forming burrs. The burr-galling operation is very cumbersome and brings about increase in cost. The formation of such burrs is a serious problem to be solved not only in the semiconductor industry and electronic industry requiring the smoothness of the inner surface of the housing but also in the food industry and chemical industry. When a fluid exhibits high corrosion, the burrs will corrode and be scattered in the form of minute metallic particles which may pass through the filter medium.

Generally, the filters of the aforementioned types are coupled to pipes through couplers, as illustrated in FIG. 10, by inserting cylindrical coupling portions 47 into the inlet and outlet portions 41a and 41b, welding the inserted cylindrical coupling portions 47 and the inner surface of the housing to form a weld a, and coupling the cylindrical coupling portions 47 to pipes through the couplers. The formation of such weld a will lose the necessary smoothness of the inner surface of the housing.

OBJECT AND SUMMARY OF THE INVENTION

The present invention has been accomplished in order to solve the problems encountered by the aforementioned prior art.

One object of the present invention is to provide a pileup type filter element of a very simple construction having a plurality of unit members tightly sealed up with and connected to one another in a multilayer form and a method for the manufacture thereof.

Another object of the present invention is to provide a filter element having a possibly smallest area of contact between a support member and a porous membrane which enables the support member to sufficiently support the porous membrane thereon and the fluid flow paths to be effectively ensured, and being responsive to the recent requirements of high flow rate and minaturization.

Still another object of the present invention is to provide a pileup type disposable filter exhibiting a high tight sealing property and making it possible to reduce the cost in component part and assembling labor.

A further object of the present invention is to provide a micro-filtration filter having a function of reliably retaining filter elements, improving safety from the reverse pressure and being suitable for inexpensive mass production.

To attain the objects described above, according to the present invention, there is provided a filter element comprising a plurality of unit members and a plurality of spacers interposed one each between the adjacent unit members, each of the unit member comprising a supporting plate having a pair of planar porous membranes joined to the opposite surfaces thereof and also having an opening for insertion of a spacer and removal of a cleaned fluid, the opening having an inner peripheral surface and a stepped part which is formed on the peripheral edge thereof, each of the spacers having an outer peripheral part and a stepped part which is formed on the inner peripheral part thereof, the stepped part of the opening of one of the unit members and the outer peripheral part of one of the spacers defining a first axial seal part therebetween, the inner peripheral surface of the opening of another one of the unit members and the stepped part of said one of the spacers defining a second axial seal part therebetween, the unit members and the spacers being interconnected by tightly joining the supporting plates and the sapcers at the first and second axial seal parts.

According to the present invention, there is also provided a method for the manufacture of a filter element comprising the steps of (a) preparing a plurality of unit members and a plurality of spacers being interposed one each between the adjacent unit members, each of the unit members comprising a supporting plate having a pair of planar porous membranes joined to the opposite surfaces thereof and also having an opening for insertion of a spacer and removal of a cleaned fluid, the opening having an inner peripheral surface and a stepped part which is formed on the peripheral edge thereof, each of the spacers having an outer peripheral part and a stepped part which is formed on the inner peripheral part thereof (b) forming a first axial seal part between the stepped part of the opening of one of the unit members and the outer peripheral part of one of the spacers by means of thermal fusion in the axial direction, (c) forming a second axial seal part between the inner peripheral surface of the opening of another one of the unit members and the stepped part of said one of the spacers be means of thermal fusion in the axial direction, and (d) repeating th steps (b) and (c), thereby interconnecting the unit members and spacers at the first and second axial seal parts.

Furthermore, according to the present invention, there is also provided a filter element comprising a plurality of unit members, a plurality of spacers interposed one each between the adjacent unit members, and a plurality of gaskets, each of the unit members comprising a supporting plate having an opening for removal of a cleaned fluid and a pair of planar porous membranes of thermoplastic sysnthetic resin of the same shape joined in an overlapped state to each other at their respective outer edges and enclosing the supporting plate, each of the gaskets having one surface thereof attached to the surface of the planar porous membrane and the other surface thereof attached to the surface of the spacer with a solvent at a position in the vicinity of the opening of the supporting plate, the unit members and the spacers being interconnected at the gaskets.

Furthermore, according to the present invention, there is provided a micro-filtration filter comprising upper and lower housings, connection tube parts inserted into the opposie ends of the upper and lower housings and thrust into the interiors of the housings to give rise to projected tube parts, annular depressions formed by projecting parts of the housings outwardly to enclose the projected tube parts, a filter element accommodated within the housings, a projected part having a flow path, having one end thereof inserted into one fo the projected tube parts and disposed on the upstream side of the filter element, and an O-ring for attaching the other projected tube part on the downstream side of the filter element to the corresponding annular depression.

The above and other objects, characteristic features and advantages of the present invention will become more apparent to those skilled in the art as the disclosure is made in the following description of preferred embodiments of the invention, as illustrated in the accompanying drawings.

BRIEF DESCRIPTION OF THE DRAWINGS

FIG. 32(A) is an exploded perspective view illustrating porous membranes, a supporting member and a spacer used in the filter element of FIG. 31.

FIG. 32(B) is a bottom view of the supporting member of FIG. 32(A).

DETAILED DESCRIPTION OF THE PREFERRED EMBODIMENTS

Figure 1:
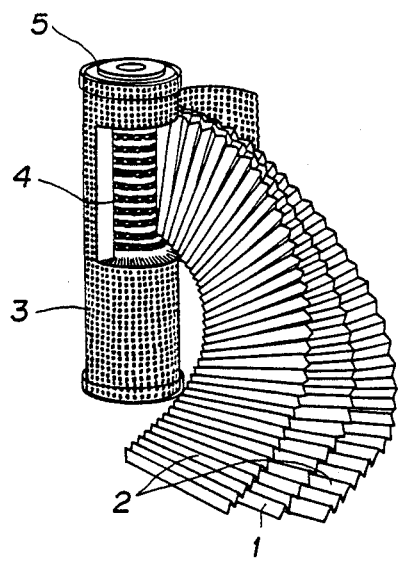
FIG. 1 is an explanatory perspective view illustrating a prior art pleat type filter.
Figure 2:
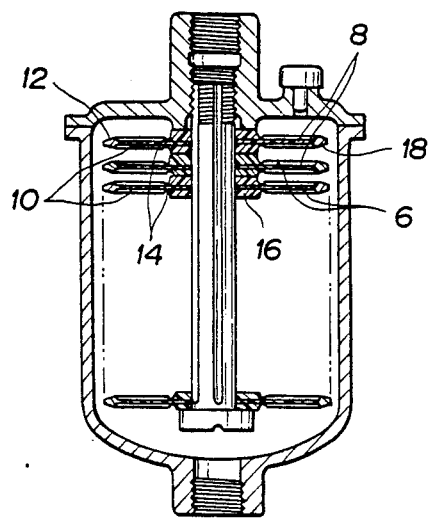
FIG. 2 is an explanatory cross section illustrating a prior art pileup type filter.
Figure 3:
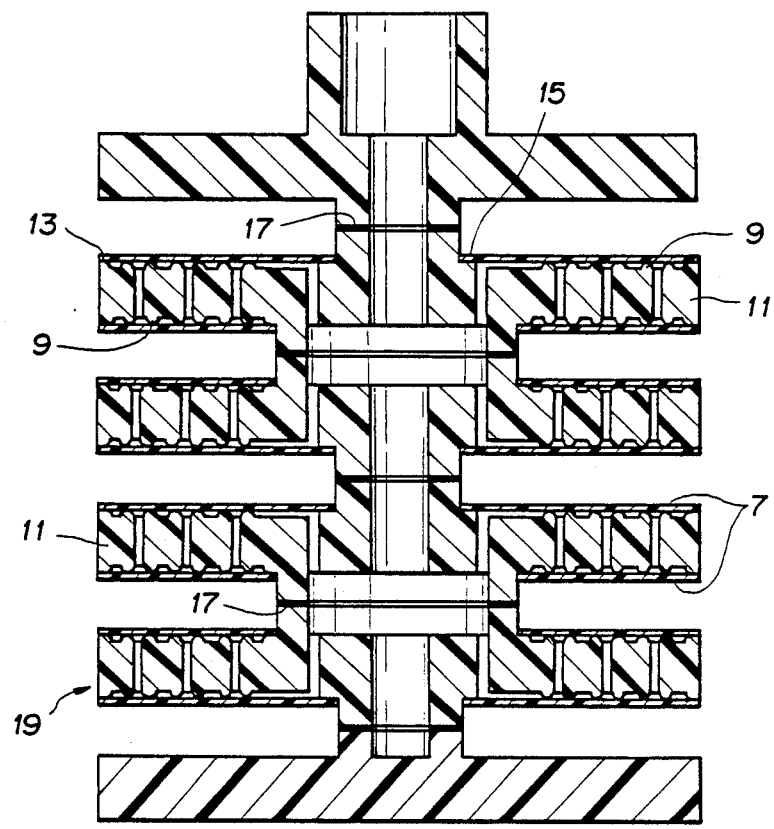
FIG. 3 is a cross section illustrating a prior art filter element.
Figure 4A:
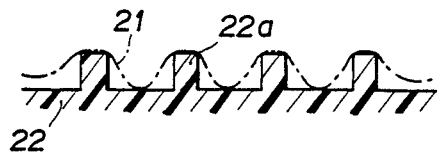
FIGS. 4(A) and 4(B) are cross-sectional views each illustrating the relation between a support member and a porous membrane of a prior art unit member.
Figure 4B:
Figure 5:
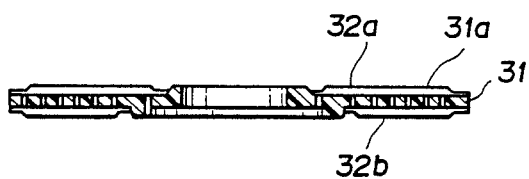
FIG. 5 is a cross section illustrating another prior art unit member having two porous membranes of different shapes attached to a support member.
Figure 6:
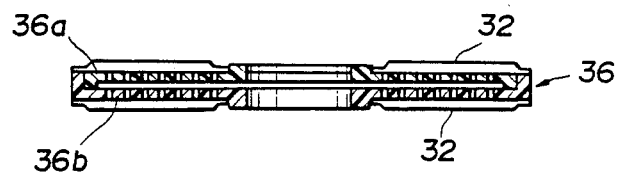
FIG. 6 is a cross section illustrating still another prior art unit member having two porous membranes of the same shape attached to a support member.
Figure 7:
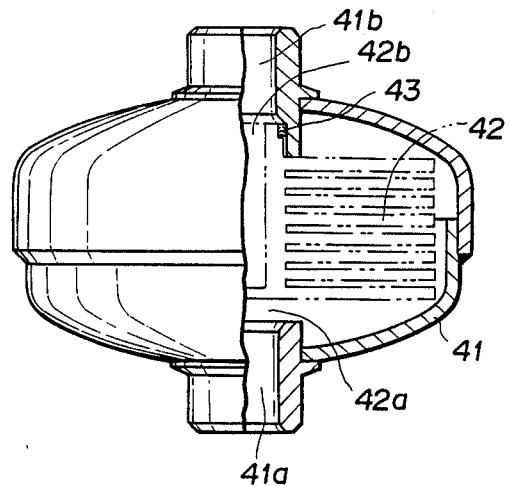
FIG. 7 is a partially cutaway front view illustrating a prior art filter.
Figure 8:
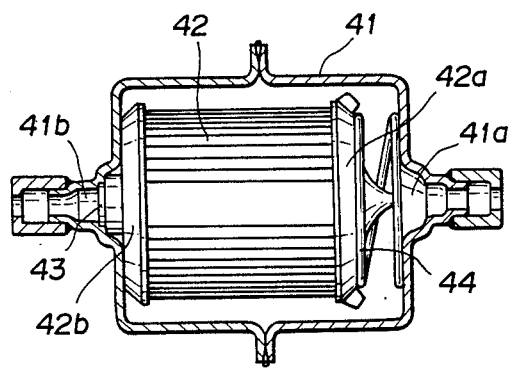
FIG. 8 is a cross section illustrating another prior art filter.
Figure 9A:
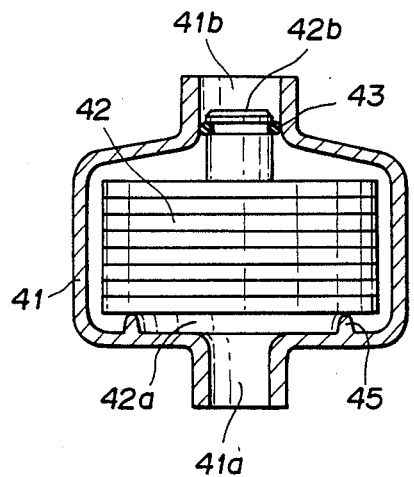
FIGS. 9(A) and 9(B) are cross-sectional views illustrating further prior art filters.
Figure 9B:
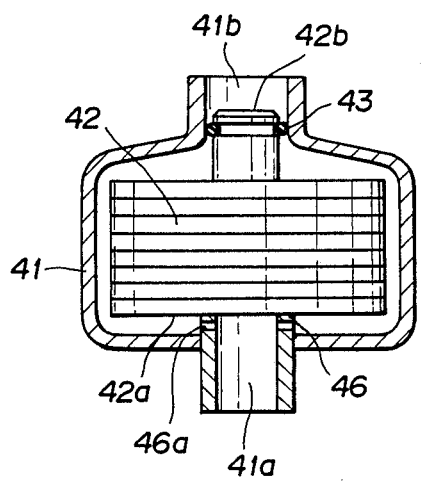
Figure 10:
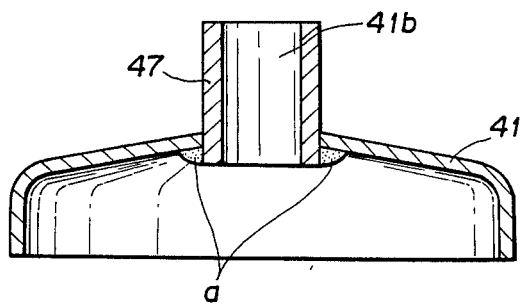
FIG. 10 is a cross section illustrating part of a prior art housing having a coupler for connection to a pipe welded thereto.
Figure 11:
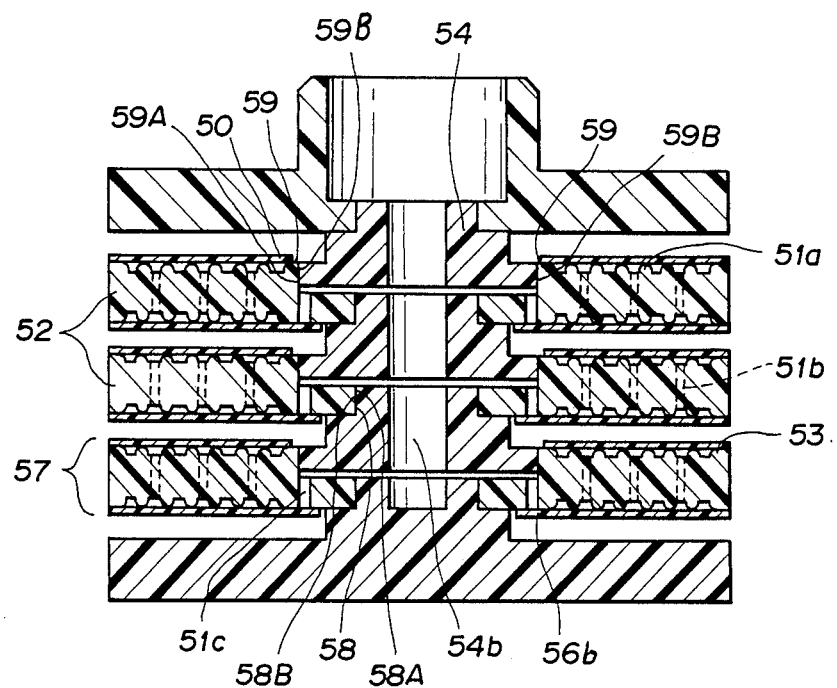
FIG. 11 is a cross section illustrating one embodiment of a filter element according to the present invention.

FIG. 11 is a cross section of a filter element or filter assembly (laminate) constructed in accordance with the first embodiment of the present invention.

On the obverse and reverse surfaces of supporting plates 52 are formed projected parts 51a which serve the purpose of supporting planar porous membranes 50 and forming flow paths for a cleaned fluid. Unit or filter members 57 are constructed by tightly joining the porous membranes 50 with thermally fusing means to outer circumferential edge parts 53 of the supporting plates 52 and, as illustrated in FIG. 13, also to circumferential edges 56a and 56b of openings 55 for insertion of annular spacers 54 and for removal of a cleaned fluid.

The unit or filter members 57 and the spacers 54 interposed one each between the adjacent unit members 57 are interconnected by tightly joining the supporting plates 52 and the spacers 54 at the positions of first seal parts 59 and second seal parts 58 by means of thermal fusion.

The second seal parts 58 are formed between stepped parts 58A formed on the inner circumferential part of the spacers 54 and inner circumferential surfaces 58B of the openings 55 of the unit members 57 and are used to join the stepped parts 58A and the inner circumferential surfaces 58B by fusion. The first seal parts 59 ar formed between outer circumferential parts 59B of the spacers 54 and stepped parts 59A formed on the circumferential edges of the openings 55 of the supporting plates 52 and are used to join the outer circumferential parts 59B and the stepped parts 59A by fusion.

Figure 12:
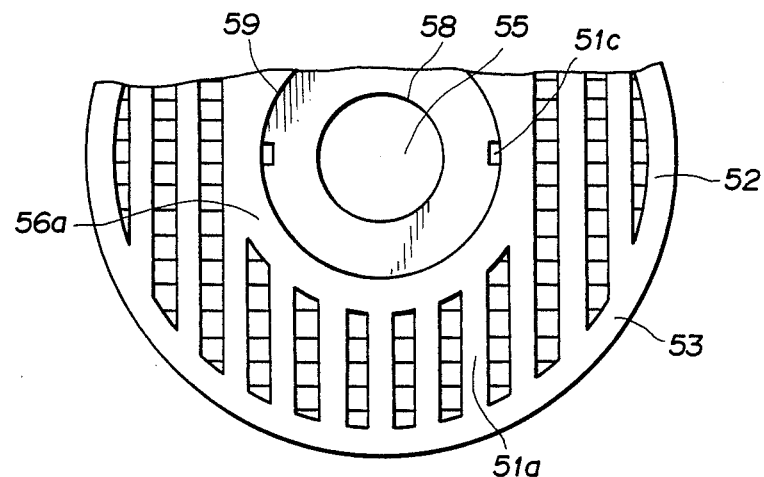
FIGS. 12 and 13 are a partially cutaway plan view and a cross section respectively illustrating one example of a supporting plate usable for the filter element.
Figure 13:
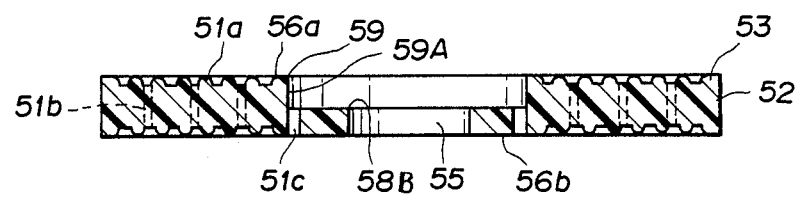
Figure 14:
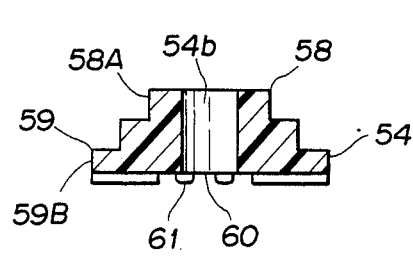
FIGS. 14 and 15 are a cross section and a bottom view respectively illustrating a spacer used in conjunction with the supporting plate of FIG. 12.
Figure 15:
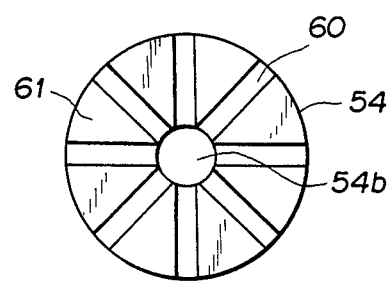

FIGS. 12 and 13 are respectively a plan view of the supporting plate 52 in the present embodiment and a cross section taken through the plan view. In these diagrams, convergent orifices 51b are intended to establish communication between the obverse and reverse surfaces of the supporting plates 52 and outlet holes (convergent orifices) 51c to permit discharge of a cleaned fluid. FIGS. 14 and 15 are respectively a cross section and a bottom view of the spacer 54 in the present embodiment. The spacer 54 is provided on the surface thereof for fitting to the supporting plate 52 with ribs 61 and grooves 60 which are formed for the purpose of giving rise to flow paths for a cleaned fluid. An outlet part 54b is formed in the central part of the spacer 54 for release of the cleaned fluid.

Figure 16:
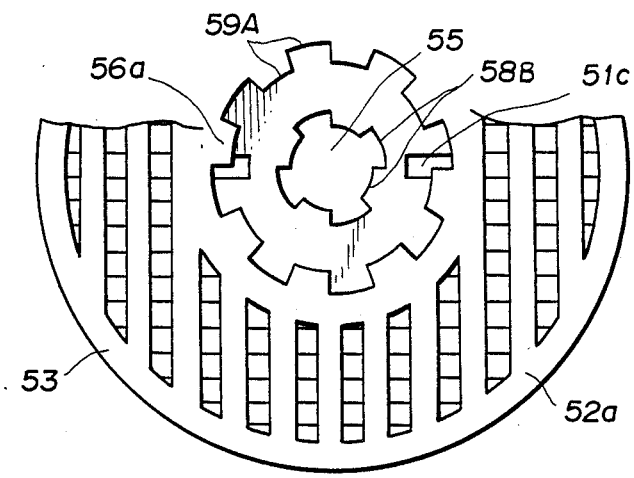
FIGS. 16 and 17 are a partially cutaway plan view and a cross section respectively illustrating another example of a supporting plate usable for the filter element.
Figure 17:
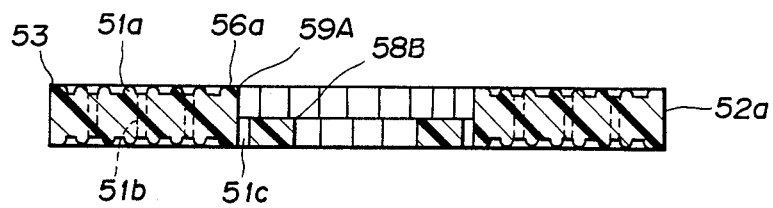
Figure 18:
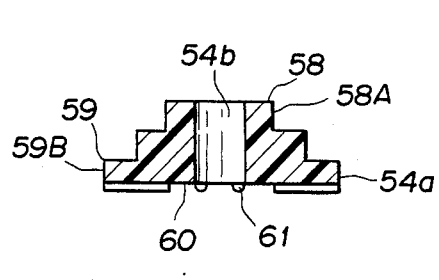
FIGS. 18 and 19 are a cross section and a bottom view respectively illustrating a spacer used in conjunction with the supporting plate of FIG. 16.
Figure 19:
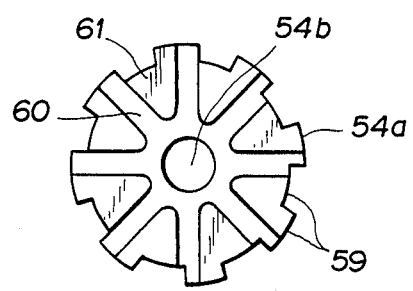
Figure 20:
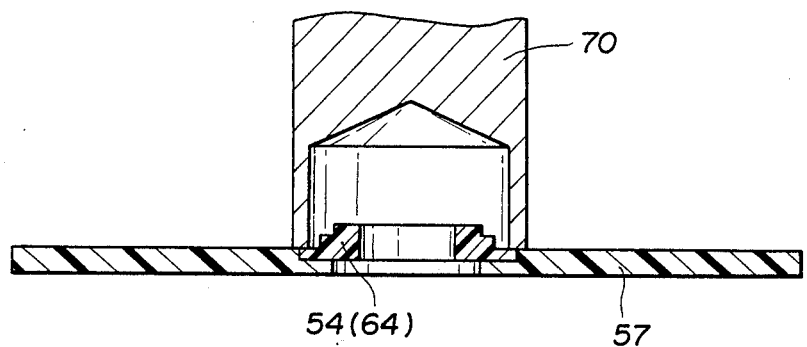
FIGS. 20 to 23 are explanatory cross-sectional views illustrating processes for manufacturing the filter element.
Figure 21:
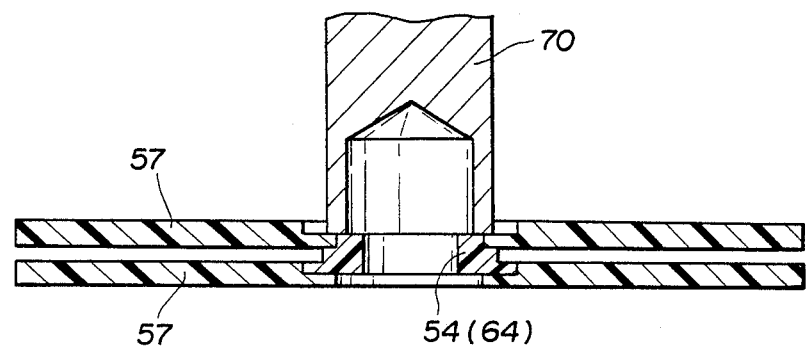
Figure 22:
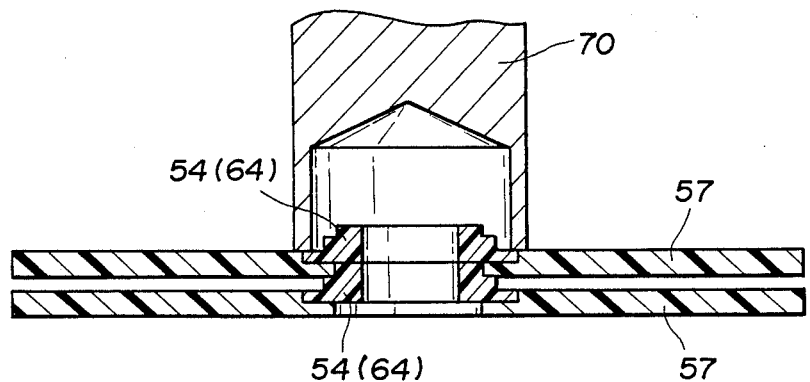
Figure 23:
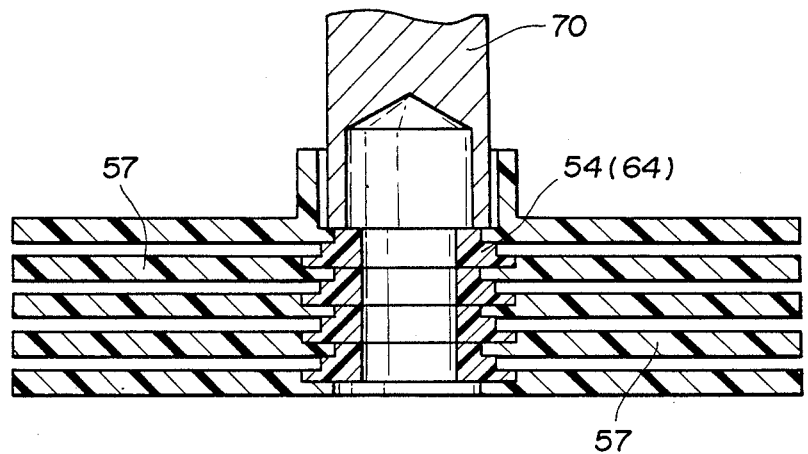

FIGS. 16 and 17 are respectively a plan view and a cross section illustrating a supporting plate 52a in an altered construction and FIGS. 18 and 19 are respectively a cross section and a bottom view of a spacer 54a to be connected to the supporting plate 52a. In these diagrams, the equal parts to those of the diagrams mentioned above are denoted by equal reference numerals.

In the present embodiment, seal parts 58a and 59a for the supporting plate 52a and the spacer 54a are fitting parts each in the shape of a cogwheel. These parts are adapted to increase the respective distances of fitting and enhance the strength of union of the supporting plate 52a and the spacer 54 as the fusion.

The porous membranes 50, the supporting plates 52, the spacers 54 and other members which are exposed to a fluid are formed of fluorine resin or fluorine resin copolymer. The porous membranes 50 have a pore diameter in the range of 0.01 to 5 microns, a porosity of not less than 20% and a thickness in the range of 50 to 200 microns. Optionally, the supporting plates 52 and the spacers 54 may be formed of a thermoplastic polyolefin resin or polyolefin copolymer.

FIGS. 20 to 23 ar diagrams for illustrating a typical sequence of steps for effecting simultanteous preheating and depressing of the seal parts in the present invention. As a means for the preheating, any of various methods available for heating parts given to be joined by fusion may be employed. For example, flame, a blower of hot air or an ultrasonic device may be used. It is desirable to use a hot press adapted to effect the depression with a heated metallic member 70.

Figure 24A:
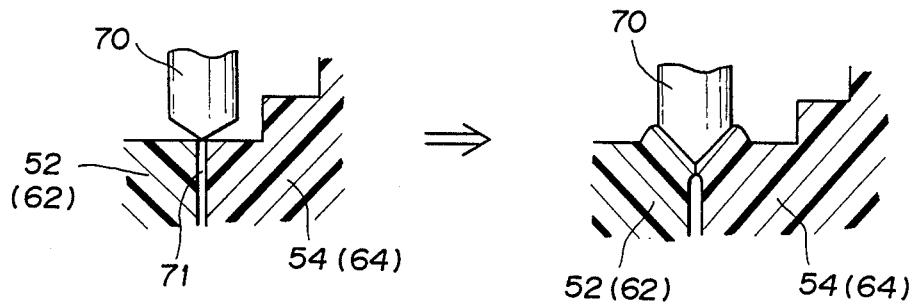
FIGS. 24(A), 24(B) and 24(C) are explanatory views each illustrating fusion between the supporting member and the spacer.
Figure 24B:
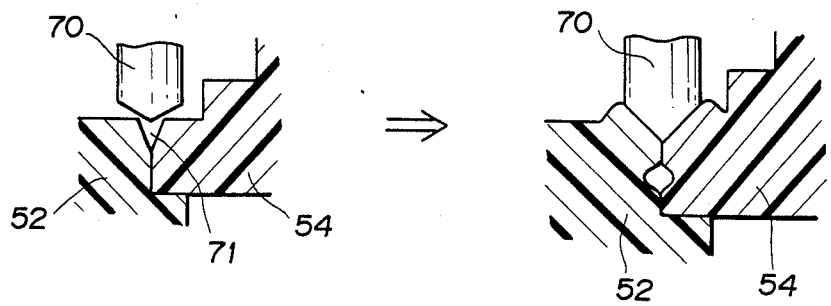
Figure 24C:
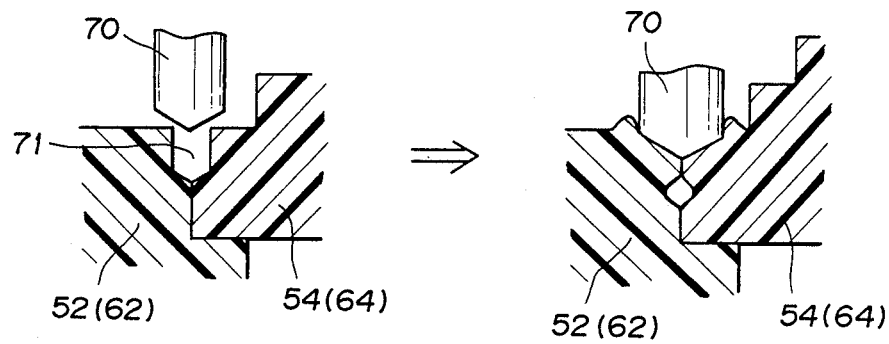

FIGS. 24(A), 24(B) and 24(C) are detailed diagrams each illustrating a typical fusion to be effected between the supporting member and the spacer.

As illustrated in the diagrams, a groove 71 is formed between the portions destined to be joined by fusion so as to admit the portions of resin of the two parts to be melted with a heat source 70. As a result, the two parts are fused with increased strength.

Figure 25A:
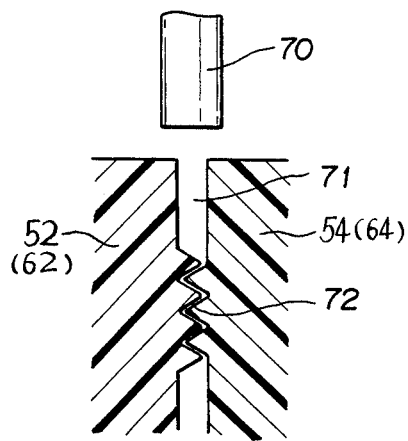
FIGS. 25(A) and 25(B) are explanatory views illustrating another example of fusion between the supporting member and the spacer.
Figure 25B:
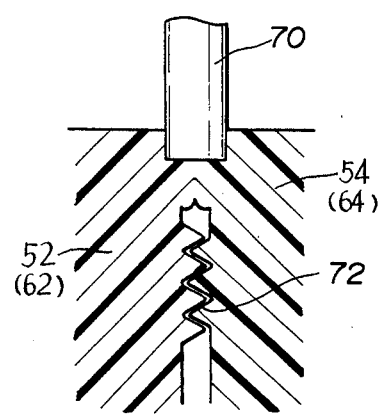
Figure 26:
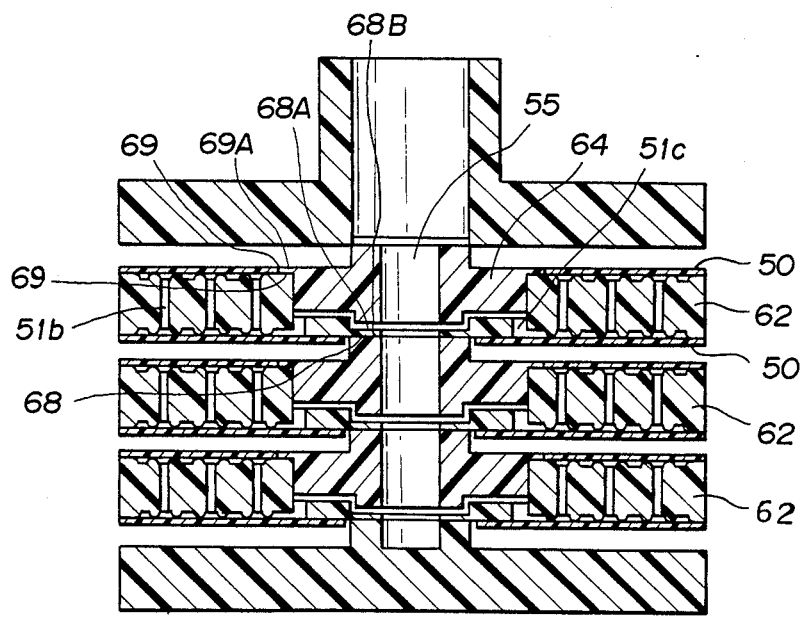
FIG. 26 is a cross section illustrating another embodiment of the filter element according to the present invention.
Figure 27:
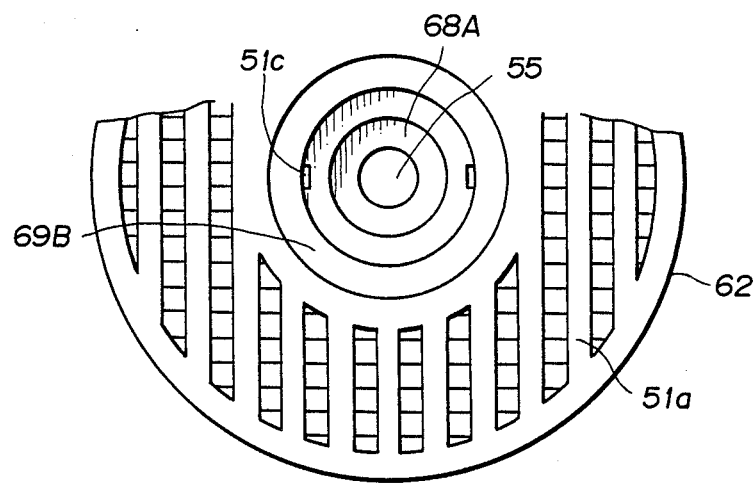
FIGS. 27 an 28 are a partially cutaway plan view and a cross section respectively illustrating one example of a supporting plate usable for the filter element of FIG. 26.
Figure 28:
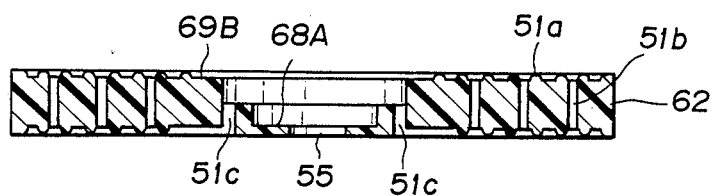
Figure 29:
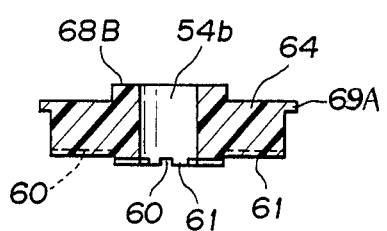
FIGS. 29 and 30 are a cross section and a bottom view respectively illustrating a spacer used in conjunction with the supporting plate of FIG. 27.
Figure 30:
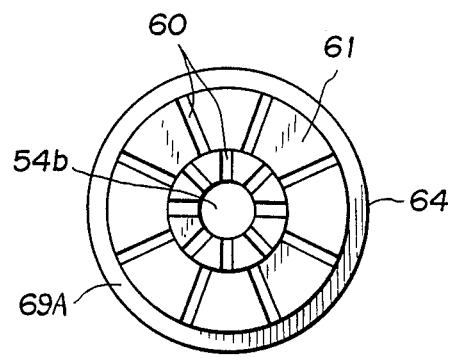

FIGS. 25(A) and 25(B) illustrate a modification of the groove 71 by the incorporation of a structure 72 of helical joint in part thereof to ensure further addition to the fastness with which a seal is formed between the two parts.

FIGS. 26 to 30 illustrate a second embodiment of this invention. In these diagrams, the equal parts to those of the preceding diagrams of the first embodiment are denoted by equal reference numerals. The equal constructions and the equal materials to those already described are omitted from the following description.

In the present embodiment, second seal parts 68 and first seal parts 69 are formed between supporting plates 62 and annular spacers 64. In the second seal parts 68, annular thin-wall parts 68A formed along the circumferential edge parts of openings in the supporting plates 62 and projected parts 68B of the spacers 64 are tightly joined by being heated and pressed with heating means.

In the first seal parts 69, annular thin-wall parts 69A formed along the outer circumferential parts of the spacers 64 and the circumferential edge parts 69B of the openings of the supporting plates 62 are tightly joined by being heated and pressed with heating means. The seal parts in the successively superposed layers are joined to complete the laminate aimed at in the same manner as in the preceding embodiment by sequentially fusing the thin-wall parts 68A and 69A in the individual layers with the heat and pressure applied in the axial direction of lamination. Since the fluorine type resin is deficient in thermal conductivity, one of the two parts subjected to fusion is formed in a thin-wall structure so as to permit indirect preheating. Though the optimum thickness of the annular thin-wall part is variable with the kind of resin to be used, it is required to fall in the range of 100 to 400 microns, preferably 150 to 250 microns, to warrant ample strength.

In a filter which is produced by superposing porous membranes capable of infallibly removing minute particles from a strongly acidic or strongly basic corrosive fluid, a highly reactive fluid or an organic solvent in combination with supporting plates, when all the members exposed to the fluid are made of fluorine resin or fluorine resin copolymer, simple and safe fusion of the unit members of the laminate has been attained only with difficulty because the fluorine type resin possesses chemical and thermal stability as compared with other general purpose resin. In accordance with the present invention, the parts subjected to fusion can be joined by simultaneous application of heat and pressure without requiring any special device designed exclusively for fusion or without being affected by the construction peculiar to the laminate. In the laminate of this invention, therefore, the sealing can be attained easily with notably heightened accuracy as compared with the conventional laminate.

Even when all the parts to be exposed to a fluid are made of a fluorine type resin which is both chemically and thermally stable, therefore, the laminated filter contemplated by this invention can be produced in a compact structure containing highly reliable sealed parts.

This invention can be applied effectively to a laminate using parts made of a polyolefin type resin which is as deficient in adhesiveness as the fluorine type resin.

Figure 31:
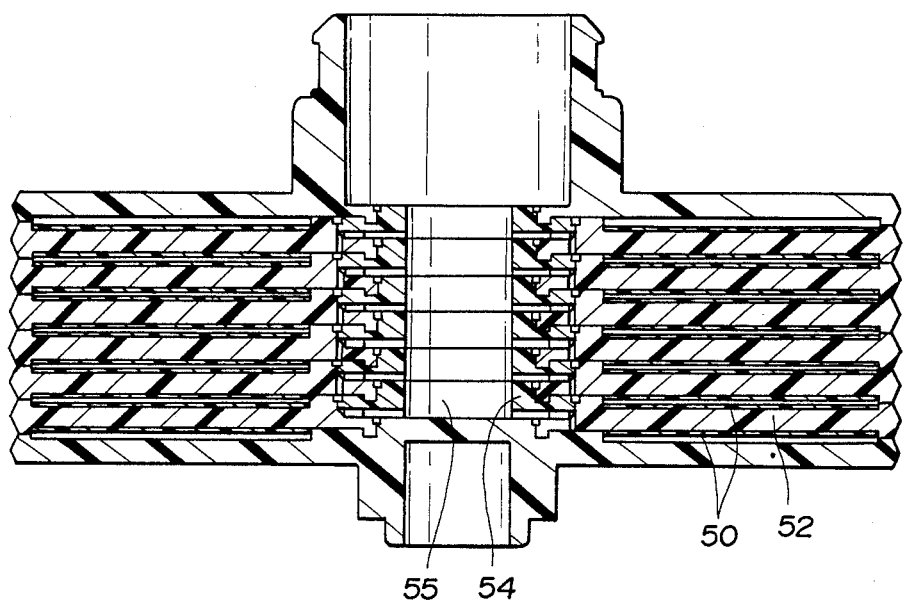
FIG. 31 is a cross section illustrating still another embodiment of the filter element according to the present invention.

Now, another typical filter element composed of planar porous membranes and supporting plates will be described below with reference to FIGS. 31 and 32 as another embodiment of this invention.

The filter element is constructed by joining planar porous membranes 50 one each to the opposite surfaces of supporting plates 52 along the circumferential edges thereof, thereby forming unit members 57, and superposing these unit members 57 through the medium of spacers 54 provided with projected parts 54c. A multiplicity of projections 57a are formed on the surfaces 52a of the supporting plates 52 for contact with the porous membranes. Further on the surfaces 52a for contact with the prous membranes, convergent orifices 51a and 51c communicating with an outlet flow path 55 of the filter element are formed. The convergent orifices 51b are intended to establish communication between the opposite surfaces of the supporting plates 52 and are disposed as radially arranged. The convergent orifices 51c are disposed along the circumference of the outlet flow path 55 of the filter and are directly connected to the outlet flow path 55. The projected parts 51d formed near the convergent orifices 51b and 51c are larger than the projections 51a mentioned above. The total of the surface areas of the openings of these convergent orifices 51b and 51c must be at least equal to the surface area of the outlet flow path 55 of the filter in one unit member 57. When the convergent orifices 51b and 51c are formed in a circular shape, their diameters must be at least 0.8 mm because of the restrictions imposed on account of injection molding. In the present embodiment, the projections 51a are assumed to be formed in a circular shape. When the projections 51a measuring 0.7 mm in diameter and 0.3 mm in height are disposed one each at the corners of an equilateral triangle of 1.4 mm, the convergent orifice 51b cannot be easily disposed among the boundaries of the projections 51a. When one convergent orifice 51b is disposed among the projections 51a at all, the projections 51a surrounding the convergent orifice 51b are required to possess a diagonal distance of 2.8 mm. In this case, the porous membrane is stretched in proportion as the inflow pressure is increased, with the result that the empty space layer in the flow path is decreased eventually to induce total closure of the flow path. This phenomenon becomes conspicuous in proportion as the porous membrane loses in nerve. Even while the inflow pressure is constant, the flow volume continues to decrease with the elapse of time. The flow rate eventually reaches a fixed level. Thus, the projected parts 51d disposed around the convergent orifices 51b are formed in larger dimensions of 1.0 mm in diameter and 0.4 mm in height. The increased dimensions serve the purpose of precluding the closure of the flow path due to the stretching of the porous membrane and ensuring retention of stable flow volume properties in spite of an increase in the inflow pressure. Further, longitudinal ribs 51e formed in the central part of the convergent orifices 51b add to the stability with which the flow volume properties are retained. The projections 51a and the projected parts 51d formed on the supporting plates 52 are disposed after the pattern of equilateral triangles discretely arranged in rows and these projections 51a and projected parts 51d are severally formed in the shape of a hemisphere or a circle. It has been confirmed that desirably the projected parts 51d have a diameter 0.5 to 10 times the diameter of the opening of the convergent orifices and a height in the range of 0.2 to 2 mm. The planar porous membranes 50 are formed of a polymer film having an orifice diameter in the range of 0.01 to 5 microns, a porosity of not less than 20% and a thickness in the range of 50 to 200 microns. The material for the polymer film may be freely selected to suit the particular application for which the laminated filter is used. Examples of the material include tetrafluoroethylene, cellulose acetate, cellulose nitrate, polypropylene, polyvinyl alcohol, polyamide, polymehtyl methacrylate, polysulfone, polyether sulfone and polyvinyl chloride.

Now, the operation of the embodiment described above will be explained below.

A cleaned fluid which has passed through the planar porous membranes 50 supported with the projections 51a and the projected parts 51d, namely hemispherically or circularly protuberant ribs, formed on the surfaces of the supporting plates 52 for contact with the porous membranes finds its way through the flow paths or empty spaces formed by the projections 51a and the projected parts 51d jointly with the porous membranes 50 to the convergent orifices 51c communicating with the outlet flow path 55 of the filter. The cleaned fluid departs from the laminated filter through the outlet flow path 55 of the filter.

In this condition, in spite of the increase in the inflow pressure, the planar porous membranes 50 are prevented from being warped and are enabled to retain the flow volume properties stably because the projected parts 51d formed near the convergent orifices 51b and 51c are larger than the other projections 51a.

The product of the present embodiment of this invention and the conventional countertype are compared in terms of flow volume properties in the following table.

| Pressure (kg/square cm) | 0.1 | 0.2 | 0.3 | 0.4 | 0.5 |
| --- | --- | --- | --- | --- | --- |
| Product of the invention (Nl/min) | 58 | 99 | 133 | 168 | 192 |
| Conventional countertype (Nl/min) | 50 | 85 | 114 | 145 | 172 |

Fluid: Air (25 degrees C.)

As is clear from the foregoing description, since this invention contemplates giving a larger size to the projected parts formed near the convergent orifices than to the other projections so as to cope with the increase in the inflow pressure, it enjoys the advantage that the contact areas between the supporting plates and the membranes are minimized, the membranes are prevented from being warped and are allowed to retain the flow volume properties stably, and the filter is enabled to pass the fluid under treatment in a high flow volume and consequently allowed to be produced in a compact structure. Thus, the filter element offered by the present invention enjoys very high practical utility.

Since the recent semiconductors are tending toward augmentation of both density and integration, the carrier gas, etching gas, purging gas and other processing gases used in the production of semiconductors require use of a filter which is endowed with a high capacity for cleaning and an ability to lower the pressure loss to the largest possible extent. This invention can provide a filter which satisfies the requirement infallibly.

Figure 33:
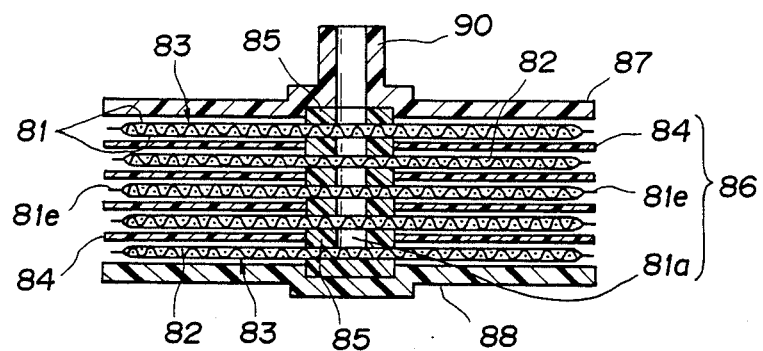
FIGS. 33 to 40 are cross-sectional views illustrating further embodiments of the filter element according to the present invention.

FIGS. 33 to 42 illustrate a typical planar membrane laminated filter as yet another embodiment of the present invention. FIG. 33 is a cross section of the total filtration type, FIG. 34 a cross section of the cross flow type, FIG. 35 a cross section of a modification of the total filtration type, and FIG. 36 a cross section of a modification of the cross flow type.

In the diagrams, planar porous membranes 81 possess countless continuous through pores having the diameter approximately in the range of 0.01 to 10 microns. The porous membranes 81 in the present embodiment assume a circular shape. In the total filtration type of FIG. 33, an outlet opening part 81a for discharge of a cleaned fluid (filtrate) is bored in the central part. In the cross flow type of FIG. 34, two outlet opening parts 81b and 81c for discharge of the cleaned fluid are severally bored in the left and right half areas and one opening part 81d is bored in the central part. Two porous membranes 81 identical in shape are superposed one on top of the other through the medium of a supporting plate 82 in the form of a circular sheet interposed therebetween. A filter unit 83 is completed by tightly joining these porous membranes 81 by fusing the circumferential parts 81e and 81f thereof, except for the portions directly surrounding the outlet opening parts 81a to 81c, by means of a hot press, for example. A laminate 86 is completed by superposing a multiplicity of filter units 83 through the medium of intervening spacers 84 provided with an opening part 84a and further with a ribbed surface and, at the same time, joining them with a small amount of solvent to annular gaskets 85 formed integrally with or independently of the spacers 84 and the outer surfaces near the outlet opening parts of the porous membranes 81 for discharge of the cleaned fluid.

The supporting plates 82 or the spacers 84 can be easily obtained by punching relatively inexpensive materials such as porous materials like meshed fabric, nonwoven fabric and woven fabric formed by a continuous molding method more productive than injection molding or sheets of uniform surface irregularities formed by injection molding, for example.

The spacers 84 are provided with gaskets 85 formed integrally therewith or independently thereof. In the present embodiment, the spacers 84 are provided with separate gaskets 85 which are adapted to fit into the openings in the spacers 84. The adhesive applied to the outer surfaces near the outlet opening parts formed in the porous membranes 81 for discharge of the cleaned fluid ensures the perfectness of the union of the filter unit by fusion. Generally, when synthetic resin materials are mutually joined with adhesive agent, the solvent selected for the union is required to possess compatibility with the separate materials being joined. In the present embodiment, this general principle does not apply to the fusion of the porous membranes 81 with the adhesive.

In the present embodiment, there is used a solvent which is incapable of dissolving the porous membranes 81 and capable of dissolving the gaskets 85 made of synthetic resin. With this adhesive agent, the union of the porous membranes 81 is obtained infallibly by causing the solvent to dissolve the surfaces of the gaskets 85 and then pressing the porous membranes 91 against the dissolved surfaces of the gaskets 85, thereby enabling the dissolved resin on the surfaces of the gaskets 85 to enter the pores in the porous membranes 81. When the solvent thus selected possesses a lowest possible boiling point, the desired union is attained substantially as effectively as possible by the thermal fusion without entailing the problem of toxicity due to residual solvent or the deterioration of the relevant members by aging. To cite a typical combination, where the porous membranes are made of cellulose acetate, for example, the gaskets are desired to be made of polysulfone or polycarbonate and the solvent to be made of trichloroethylene. When the porous membranes are made of polyamide, polypropylene, polyethylene or fluorine type resin which offers relatively high resistance to solvents in general, the material for the solvent and that for the gaskets can be selected in considerably wide ranges.

Figure 34:
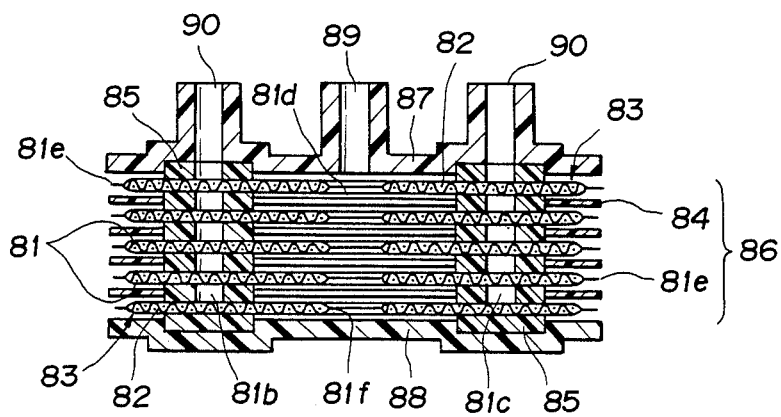
Figure 35:
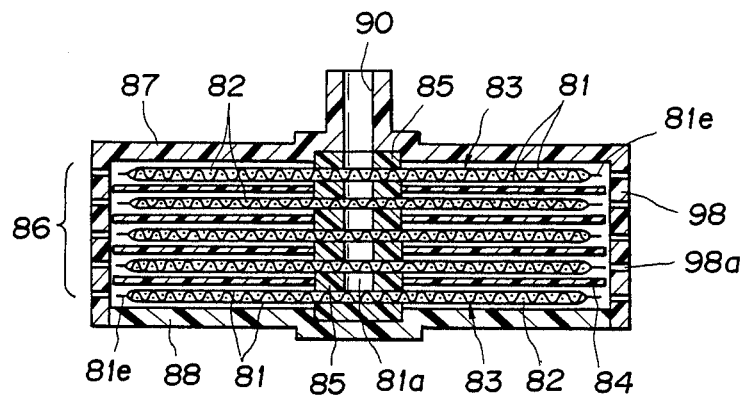
Figure 36:
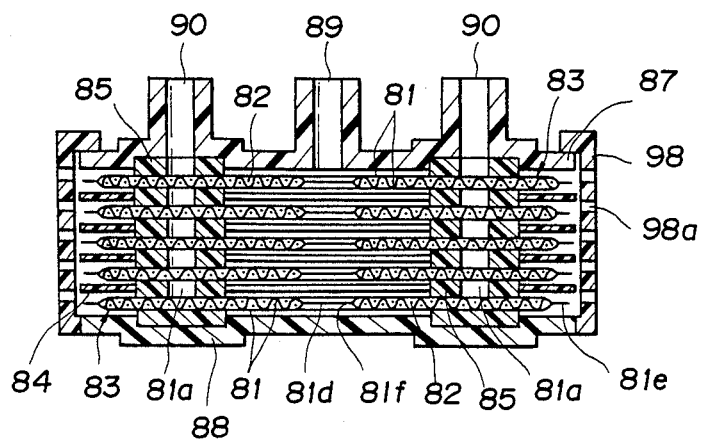

The laminate 86 is further provided at the opposite ends thereof in the axial direction of lamination with protective members 87 and 88 each possessing ribs on the inner surfaces thereof. Either or both of these protective members are provided with inlets 89 for the raw fluid under treatment and the outlets 90 for the cleaned fluid. FIG. 33 depicts a case in which the protective member 87 is provided with an outlet 90 for the cleaned fluid. FIG. 34 depicts a case in which the protective member 87 is provided with an inlet 89 for the raw fluid under treatment and outlets 90 for the cleaned fluid.

Figure 37:
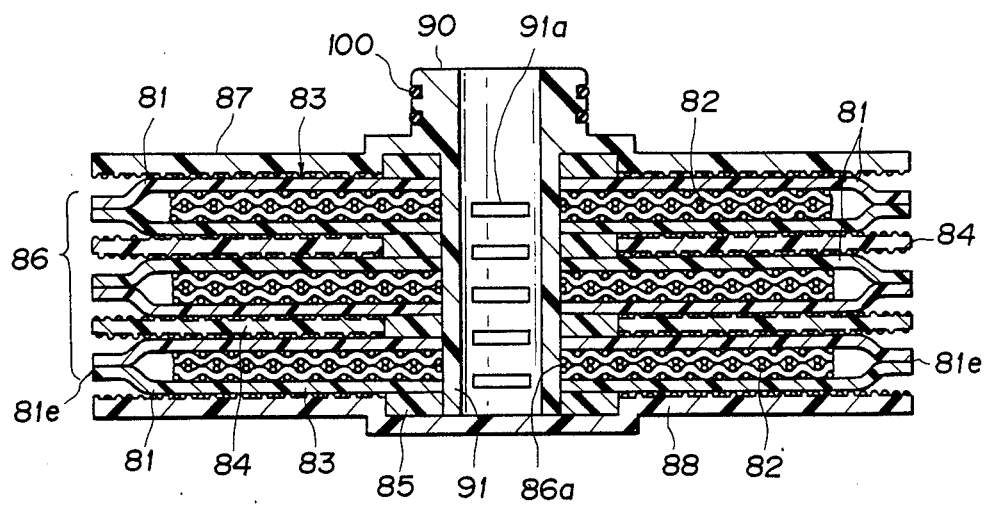

Further, as illustrated in FIG. 37, the laminate 86 is provided along the outlet opening parts 86a for the cleaned fluid with a supporting tube 91 possessing a plurality of holes 91a. The fast attachment of the supporting tube 91 to the protective members 87 and 88 disposed at the opposite ends of the laminate 86 in the axial direction of lamination thereof enables the laminate 86 to manifest the reinforcing function fully.

Figure 38:
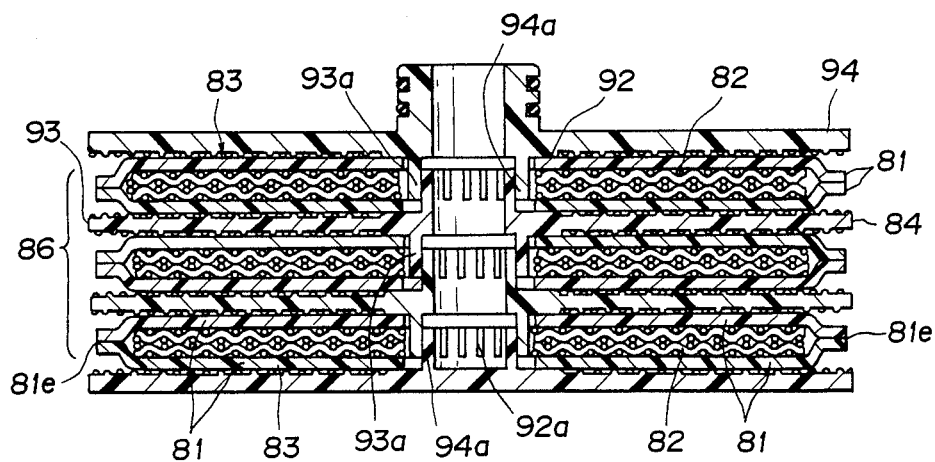
Figure 39:
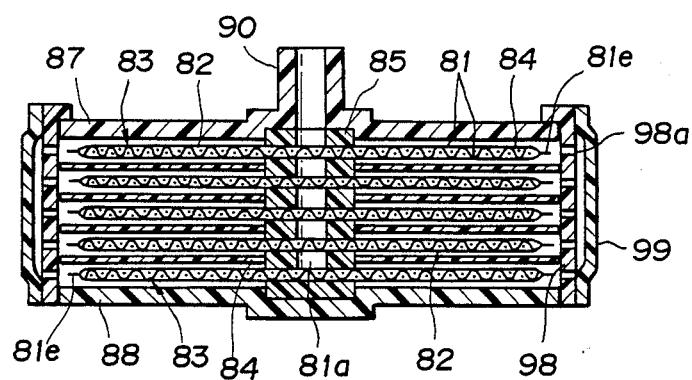
Figure 40:
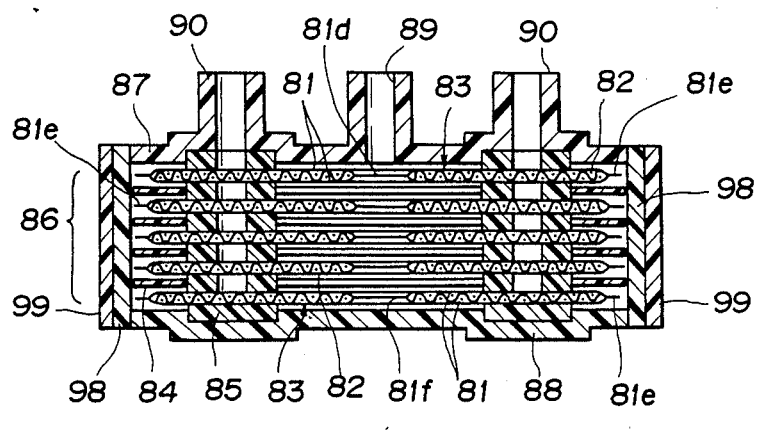

The supporting tube 92 illustrated in FIG. 38 is constructed by the combination of projected tube parts 93a of the adjacent spacers 93 and projected tube parts 94a of the protective member 94. In the supporting tube 92, communicating holes 92a are formed.

Figure 41:
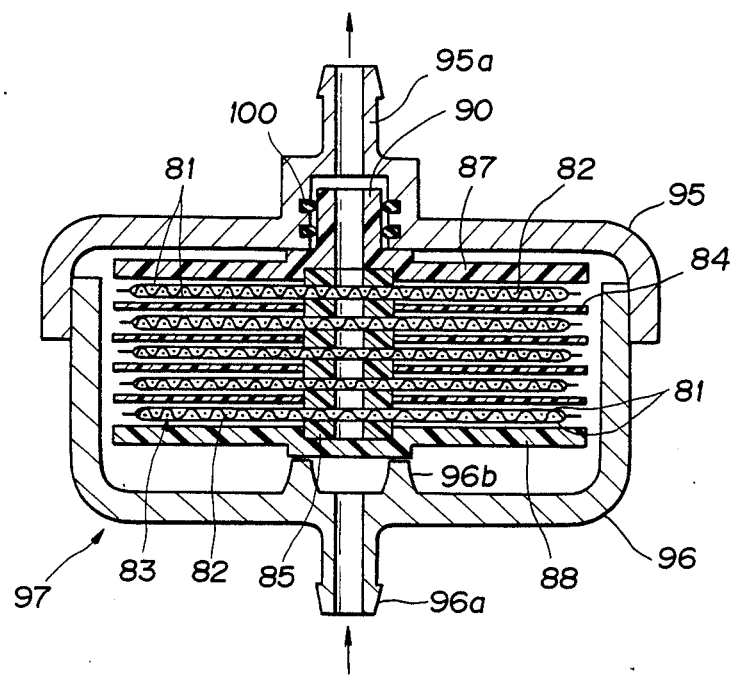
FIG. 41 is a cross section illustrating one embodiment of a micro-filtration filter according to the present invention, accommodating therein the filter element of FIG. 33.
Figure 42A:
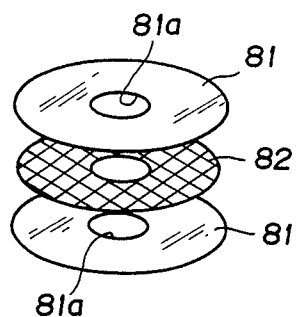
FIG. 42(A) is an exploded perspective view illustrating a supporting member used for the filter element of FIG. 33.
Figure 42B:
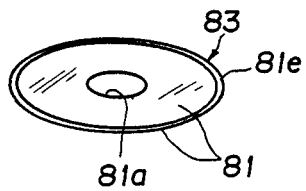
FIG. 42(B) is a perspective view illustrating the supporting member of FIG. 42(A) in a finished state.
Figure 42C:
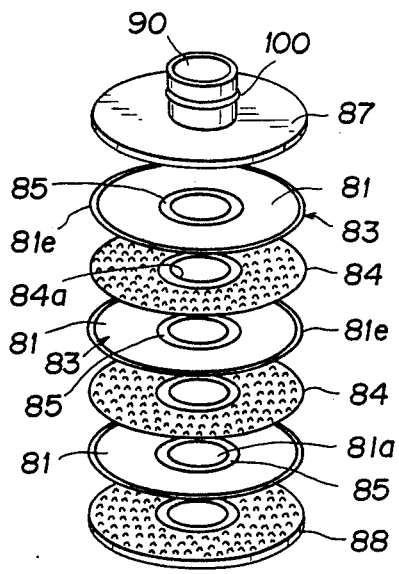
FIG. 42(C) is an exploded perspective view illustrating the filter element of FIG. 33.

A filter 97 is completed by accommodating in upper and lower housings 95 and 96 the laminate 86 and the protective members disposed at the opposite ends of the laminate 86 in the axial direction of lamination. To be specific, the filter 97 is assembled, as illustrated in FIG. 41, by combining an outlet part 95a of the upper housing 95 with the outlet 90 of the protective member 87 through the medium of an O-ring 100 and then coupling the upper housing 95 with the lower housing 96 which possesses an outlet part 96a and a projection 96b.

Now, the operation of the preceding embodiment will be described below. Since each two identically shaped porous membranes 81 are superposed so as to embrace therein one intervening supporting plate 82, the porous membranes 81 are retained stably enough to resist the pressure of filtration and are enabled to give rise to flow paths for filtration. Moreover, since each filter unit 83 is formed by fusing the circumferential edge parts 81e and 81f of the adjacent porous membranes 81 except for the portions directly neighboring the outlet opening parts 81a of the porous membranes for release of the cleaned fluid, the filter units 83 can be easily assembled so as to manifest the sealing effect permanently. Further, since a multiplicity of filter units 83 are superposed through the medium of intervening spacers 84, they attain effective retention of the flow paths for the raw fluid and offer perfect resistance to the back pressure possibly exerted from the cleaned fluid side. The laminate 86 is completed by causing the gaskets 85 disposed integrally with or independently of the spacers 84 to be joined with adhesive agent to the outer surfaces near the outlet opening parts of the porous membranes 81 for the release of the cleaned fluid. Thus, the process of assembly can be simplified and, at the same time, the otherwise possible mingling of the cleaned fluid with the raw fluid can be efficiently avoided, with the result that microorganisms or minute particles entrained by the liquid or gaseous raw fluid can be separated infallibly and then released safely through the outlets.

FIGS. 35 to 40 are cross sections illustrating still other embodiments of the present invention.

In these diagrams, the equal parts to those illustrated in the preceding diagrams are denoted by equal reference numerals. These parts will be omitted from the following description.

In the diagrams, the laminate 86 is completed by interposing the supporting plates 82 each between two planar porous membranes 81 made of thermoplastic synthetic resin and then superposing the porous membranes 81 through the medium of the spacers 84. At the opposite ends of the laminate 86 in the direction of lamination, there are formed the protective members 87 and 88. The laminate 86 is further provided on the circumference thereof in the horizontal direction with a filtration tube 98 which possesses the function of a prefilter for the porous membranes 81. This filtration tube 98 has a multiplicity of orifices 98a. By disposing a filtration member 99 on the outer periphery of the filtration tube 98, the function of a prefilter for the porous membranes 81 is enhanced.

A finished product similar to the filter illustrated in FIG. 41 can be obtained by accommodating in the upper and lower housings the laminate 86 and the protective members 87 and 88 disposed at the opposite ends of the laminate in the axial direction of lamination.

As is evident from the foregoing description, the present invention brings about the following highly desirable effects.

For example, this invention permits a disposable planar membrane laminated filter satisfying all the conditions such as perfection of seal to be produced from inexpensive parts at a low cost of assembly.

To be more specific, as sealing means for the preclusion of the otherwise possible mingling of the cleaned fluid with the raw fluid, the adjacent membranes are joined by thermal fusion and the gaskets and the porous membranes are joined by adhesion with a small amount of solvent. Thus, the laminated filter is given safe and reliable sealing with ease.

Unlike the conventional sealing means, the sealing means contemplated by the present invention does not require the porous membranes to be wholly immersed in the solvent. The solvent is required to be used only in the least possible amount. Thus, the problem of defects arising from residual solvent is notably alleviated. The permeation of excess solvent into the supporting plates and the porous membranes is also minimized. The problems ascribable to the presence in the porous membranes of an agent for impartation of hydrophilicity and the exudation of various additives to resin from the membranes are solved altogether.

Further, since the supporting plates and the spacers are formed by continuous molding instead of injection molding, they can be produced with walls of small thickness and the finished product can be obtained in a compact structure.

Figure 43:
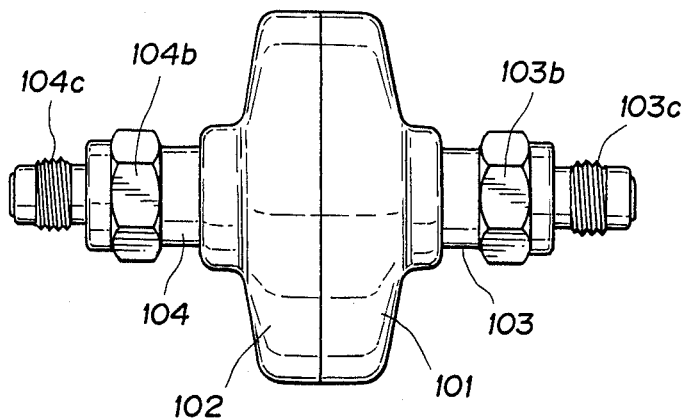
FIG. 43 is a front view illustrating another embodiment of the micro-filtration filter according to the present invention.
Figure 44:
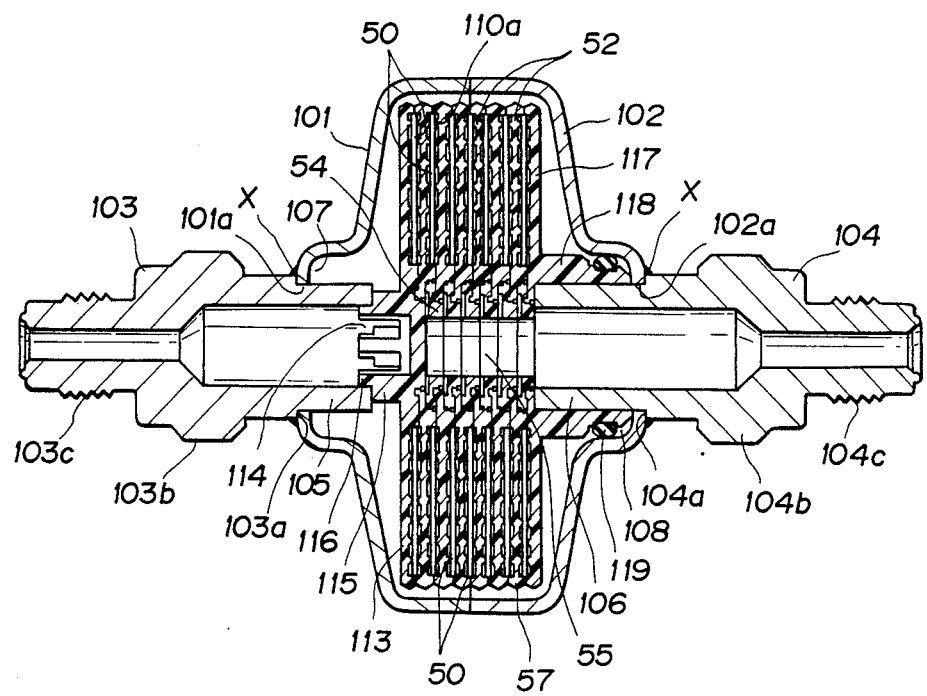
FIG. 44 is a cross section illustrating the micro-filtration filter of FIG. 43.
Figure 45:
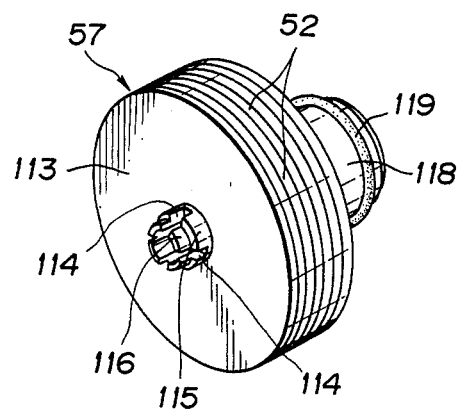
FIG. 45 is a perspective view illustrating a filter element used in the micro-filtration filter of FIG. 44.

FIGS. 43 to 45 illustrate a typical micro-filtration filter as a further embodiment of the present invention. FIG. 43 is a front view of the micro-filtration filter, FIG. 44 a longitudinal cross section taken through FIG. 43, and FIG. 45 a perspective view of a filter element as taken from the upstream side.

Connection tube parts 103 and 104 are insertred through insertion mouths 101a and 102a of an upper housing 101 and a lower housing 102 until stepped parts 103a and 104a of the connection tube parts 103 and 104 come into fast engagement with the insertion mouths 101a and 102a. Then, the outer surfaces of the housings 101 and 102 and the stepped parts 103a and 104a of the connection tube parts 103 and 104 are thrust into the interiors of the housings 101 and 102 to give rise to projected tube parts 105 and 106. The upper and lower housings 101 and 102 which enclose the projected tube parts 105 and 106 are provided with annular depressions 107 and 108 which are projected outwardly concentrically with the projected tube parts 105 and 106. On the outer circumferential surfaces of the connection tube parts 103 and 104, clamping parts 103b and 104b and male screw parts 103c and 104c for coupling are formed.

As unit members 57 for accommodation in the upper and lower housings 101 and 102, planar porous membrane laminated filter elements are used in the present embodiment. The filter elements will be described below with reference to FIG. 44. A multiplicity of flow paths 110a are formed on disk-shaped supporting plates 52. Planar porous membranes 50 are used one each for covering the obverse and reverse surfaces of the supporting plates 52. The supporting plates 52 and the annular spacers 54 are sequentially superposed. The central flow path 55 formed in the central part of the spacers 54 are caused to communicate with the flow paths 110a. Further, the central flow path 55 is caused to communicate with outlet tube parts 118. The retaining plates 113 on the upstream side of the unit member 57 are provided with projected parts 115 possessing a flow path 114. Insertion stepped parts 116 formed at the leading ends of the projected parts 115 are inserted into the projected tube parts 105 mentioned above and, at the same time, the outlet tube parts 118 formed on the retaining plates 117 on the downstream side of the unit members 57 are fitted into the annular depressions 107 through the medium of the O-rings 109 and the projected tube parts 106 are tightly fitted into the outlet tube parts 118.

The upper and lower housings 101 and 102 are perfectly identical in structure and they are butt welded to encase the unit members 57. All the parts of which the unit members 57 are formed are made of fluorine resin or fluorine resin copolymer. The planar porous membranes 50 are films of fluorine resin or fluorine resin copolymer having a pore diameter in the range of 0.01 to 5 microns, a porosity of not less than 20% and a thickness in the range of 50 to 200 microns. Otherwise, the planar porous membranes 50 may be made of a polymer suitably selected from among cellulose acetate, nitrocellulose, polyamide, polyvinyl chloride, polyvinyl alcohol, polymethyl methacrylate, polysulfone and polyester sulfone. In this case, the other components of the elements may be formed of a material which is not limited to fluorine resin or fluorine resin copolymer but is suitably selected from among various materials.

Now, the operation of the embodiment described above will be explained below.

The fluid to be cleaned which has flowed in through the connection tube part 104 on the inlet side of the lower housing 102 passes through the flow paths 114 of the projected parts 115 on the upstream side of the filter elements and disperses itself in the empty spaces on the upstream side of the filter media. The portion of the fluid which has penetrated through the filter media under the primary pressure exceeding the membrane resistance collects as a cleaned fluid in the outlet tube parts 118 on the downstream side of the unit members 57, then accumulates itself on the outlet side of the connection tube parts 103 on the downstream side of the housing 101, permitting efficient production of a cleaned fluid. In this case, since the outlet tube parts 118 are fitted in the annular depressions 107 through the medium of the O-rings 119 and, at the same time, the projected tube parts 106 are fitted into the outlet tube parts 118, the flow paths for the cleaned fluid and those for the raw fluid are tightly sealed against each other and the otherwise possible leakage through the O-rings 119 due to the shrinkage of the filter elements by heat cycle can be prevented. Thus, the filter of this invention manifests the function of sealing perfectly and effects filtration of a fluid with high accuracy.

As is evident from the foregoing description, the present invention brings about the following useful effects.

The filter enjoys highly desirable durability because the filter elements disposed inside the housings are retained safely and the function of sealing on the downstream side of the filter elements can be effectively manifested. Further, the filter of this invention enjoys notably enhanced safety against the back pressure as compared with the conventional filters. This invention also excels in economic effect in the sense that the filters thereof can be mass produced inexpensively.

What is claimed is:

1. A method for the manufacture of a filter element comprising the steps of:

(a) providing a plurality of unit members and a plurality of spacers, each of said unit members being composed of fluorine resin or fluorine resin copolymer and comprising a supporting plate having a pair of planar porous membranes joined to the opposite surfaces thereof and having an opening for insertion of a spacer and removal of a cleaned fluid, said opening having an inner peripheral surface and a stepped part formed on the peripheral edge thereof, each of said spacers being composed of fluorine resin or fluorine resin copolymer and having an outer peripheral part and a stepped part formed on the inner peripheral part thereof, (b) forming a first axial seal part between said stepped part of said opening of one of said unit members and said outer peripheral part of one of said spacers by means of thermal fusion in the axial direction, (c) forming a second axial seal part between said inner peripheral surface of said opening of another one of said unit members and said stepped part of said one of said spacers by means of thermal fusion in the axial direction, and (d) repeating the steps (b) and (c) using other ones of said unit members and spacers to thereby interconnect said unit members and spacers at said first and second axial seal parts to form a filter element.

2. A method according to claim 1, wherein portions of said supporting plates and portions of said spacers formed into said first and second axial seal parts have grooves formed therein.

3. A method according to claim 1 or claim 2, wherein said first and second axial seal parts are formed by depressing portions of said supporting plates and portions of said spacers formed into said first and second axial seal parts with a hot press.

4. A method according to claim 1 or claim 2, wherein said first and second axial seal parts are formed by depressing portions of said supporting plates and portions of said spacers formed into said first and second axial seal parts with an ultrasonic device.

5. A method according to claim 1 or claim 2, wherein said first and second axial seal parts are formed by blowing flame or hot air to portions of said supporting plates and portions of said spacers formed into said first and second axial press parts in a non-contact fashion.

6. A method of manufacturing a filter assembly comprised of axially stacked filter members separated by spacers, comprising the steps of: providing a plurality of filter members composed of thermally fusible fluorine resin or fluorine resin copolymer material, each filter member having an opening therein defined by a stepped wall having radially inner and outer circumferential wall surfaces; providing a plurality of spacers composed of thermally fusible fluorine resin or fluorine resin copolymer material, each spacer having an outer circumferential wall surfaces; axially inserting a first spacer in the opening of a first filter member with the spacer outer circumferential wall surface opposed from and facing the filter member outer circumferential wall surface and thermally fusing together the opposed wall surfaces to form a fluidtight seal therebetween; axially inserting a second filter member onto the first spacer with the second filter member inner circumferential wall surface opposed from and facing the first spacer inner circumferential wall surface and thermally fusing together the opposed wall surfaces to form a fluidtight seal therebetween; and successively repeating both inserting and fusing steps using other ones of the spacers and filter members to form a filter assembly comprised of axially stacked filter members separated by spacers.

7. A method according to claim 6; wherein at least the first thermally fusing step comprises providing a groove between the opposed outer circumferential wall surfaces, and applying heat energy to the opposed wall surfaces in the region of the groove so that the thermally fusible material melts and flows into the groove to thereby thermally fuse together the opposed wall surfaces.

8. A method according to claim 7; wherein the step of applying heat energy comprises axially pressing a heated member against the opposed wall surfaces.

9. A method according to claim 8; wherein the heated member has a pointed tip which is axially pressed into the groove.

10. A method according to claim 7; wherein the step of providing a groove comprises providing a groove defined by opposed parallel wall surfaces.

11. A method according to claim 10; wherein the opposed parallel wall surfaces converge toward one another at the bottom of the groove.

12. A method according to claim 7; wherein the step of providing a groove comprises providing a groove defined by opposed converging wall surfaces.

13. A method according to claim 7; wherein the step of providing a groove comprises providing a groove having complementary projections and recesses on the opposed wall surfaces which define the groove whereby the heat energy applied to fuse together the opposed wall surfaces also fuses together the projections to thereby strengthen the fused connection.

14. A method according to claim 13; wherein the projections and recesses comprise helical projections on one wall surface interposed between helical projections on the other wall member.

* * * * *